UNITED STATES PATENT OFFICE.

WILLIAM L. KANN, OF PITTSBURGH, PENNSYLVANIA.

ABRASIVE FOR GRINDING AND SMOOTHING GLASS.

1,387,649.　　　　Specification of Letters Patent.　　Patented Aug. 16, 1921.

No Drawing.　　Application filed March 26, 1920.　Serial No. 369,068.

*To all whom it may concern:*

Be it known that I, WILLIAM L. KANN, of Pittsburgh, Allegheny county, Pennsylvania, have invented a new and useful Improvement in Abrasives for Grinding and Smoothing Glass, of which the following is a full, clear, and exact description.

Heretofore, glass, such as plate glass, has been ground and smoothed by the use of sand as an abrasive, particularly for the rough grinding. Emery has been used for the final smoothing operation, preliminary to polishing. Coarser grades of sand are used for rough grinding and finer grades for successively finer grinding, including part of the smoothing.

In practice, sand for grinding plate glass is generally taken as it comes up from the quarries, if in rock or stone form, crushed, and perhaps washed (if it should contain much foreign or impure matter), then dried and used; no attempt being made to grade or size it or select for uniform hardness. Therefore, the bulk remaining will always contain a large per cent. of fines, of varying degrees of hardness, that are not useful for coarse grinding, which impedes the operation, by preventing the coarse grains from fully asserting themselves, as the facing or coarse grinding advances and progresses to a uniform surface.

Therefore, it is obvious that this operation of sand, which is fed to the grinding machine, is wasted, more or less, as it is thrown off by the centrifugal force of the machine, resulting in waste. Again, as the facing operation progresses, the sand being of varying degrees of hardness and because of its characteristics, breaks down irregularly, thereby producing a non-uniform face on the glass termed in the art "bad smooth," requiring more material to work it out, because if the smoothing operation is not perfect, it produces in the final result bad finish, termed in the art "short finish," necessitating that the work be done over. This short finish may not be discovered until the glass has been polished, which would require the glass to be sent back to the grinding machines to correct this bad work in the grinding and smoothing operation, and of course, necessitates that the polishing be done over. All this results in loss of time, labor, motive power, reduced production from the machines, excess of sands and emery, polishing material and obviously increased cost.

I have discovered that certain natural crystalline abrasive minerals possess characteristics rendering them peculiarly applicable for the grinding and smoothing of plate and other glass. By using them, I do away with the use of emery in the final smoothing step and use the same material throughout all the grinding and smoothing operations, up to the polishing operation. The natural mineral which I have found best suited for this purpose in crystalline garnet. Garnet occurs both in massive form, termed "almandite," and also in crystalline form. The crystalline form is better adapted for grinding and smoothing, since the crystals when broken down to smaller particles will retain sharp edges of crystalline form. In other words, the larger crystals are made up of smaller crystals which retain their original crystalline characteristics. Therefore, when the prepared garnet material, crushed, sized and freed from its impurities, is applied to the rough grinding operation, properly graded and of uniform hardness and free from any foreign matter, to whatever extent it is broken down into smaller grains during this operation, to that extent material is provided which is suitable and advantageous for the succeeding finer grinding and smoothing operations or steps. In practice, I prefer to feed just enough of the coarse garnet material in a single batch to one table to carry out the rough grinding operation thereon. At the end of this operation, the next grade of the used material which has been graded in the interim during the rough grinding is fed on the table and the operation continued in the next step; and so on, through the successive gradings of finer material.

In the use of sand, after rough grinding, the table and gutters are carefully washed to remove all rough sand preliminary to applying the next grade of fine sand, because any rough sand left will scratch the glass in the next or smoothing operation. In the case of this new material, however, I do not need to wash off the table between successive steps of grinding and smoothing. A considerable saving is thus effected. This is due partly to the much greater and uniform hardness of the garnet material as compared to sand and also to its characteristic of breaking down in operation. The scale of hardness in garnet is about eight, while sand is rated at about five to six.

The grinding operation is thus carried out, step by step, without any intermediate washing off and with the successive grades formed during the successive steps of the operation. The smoothing may then be carried to completion by the finer grades of garnet material from the previous later steps of grinding. That is, the material broken up in the grinding steps is collected and graded and used for smoothing. This grading will preferably be effected automatically by any of the well known grading systems.

In preparing this material as mined, the garnet ore is crushed, the best ore selected, then further reduced by crushing, and then separated from the gangue or impurities in which it is embedded, then further reduced in size and graded into usable or marketable sizes. These operations may be carried on by any well known methods. The crystalline form of garnet is preferable because it contains a much larger percentage of usable garnet in the recovery from the ore, besides the natural fine sizes made in the grading are crystalline in form, and not fractures, splinters, or flakes; furthermore, the final sizes of the broken up crystals can be used down to the very finest sizes to replace emery, heretofore used in smoothing. These finished sizes can be used down to flour or dust.

This material may be used to especially good advantage for the grinding and smoothing and finishing of optical glass (in which art, the requirement calls for great precision), both on account of its sharp cutting and lasting properties, and particularly, on account of its peculiar characteristics in reducing itself down in work to successively fine sizes or crystals of the same character.

If the massive form is used, it must be crushed and broken up and may be separated from the gangue in the same general manner as the crystalline form, but the percentage of garnet contained is small compared to that of the crystalline type. It also breaks up more readily, but does not break into crystal form, so that it is not as desirable.

The material is so hard compared to sand that it may be necessary to add to the recoveries from one step finer material for the next step; and on the other hand, the material recovered from one step may be in excess of that required for the next step. In such cases, finer material may be added beyond that recovered from the previous step or steps, or excess material from any step may be stored.

In my claims, I intend to cover any of the forms referred to herein, and I also intend to cover any natural crystalline or massive form of mineral which is hard enough to be of advantage in this process. For example, corundum may be employed instead of garnet.

I claim:

1. The method of grinding, smoothing and finishing glass preparatory to polishing, comprising supplying to the glass a natural crystalline abrasive of such character that as it is crushed and broken the smaller grains or particles thereby produced are of distinct crystalline form, and continuously collecting and supplying to the glass such abrasive during the grinding, smoothing and finishing operations, substantially as described.

2. The method of grinding, smoothing and finishing glass preparatory to polishing, comprising supplying to the glass a natural crystalline abrasive of uniform hardness greater than the hardness of sand and of such character that as it is crushed and broken the smaller grains or particles thereby produced are of distinct crystalline form, and continuously collecting and supplying such abrasive in successively finer grades to the glass during the grinding, smoothing and finishing operations in a series of successive stages whereby washing of the apparatus between successive grades of material supplied thereto is obviated, substantially as described.

3. The herein described method of grinding and smoothing glass, which consists in feeding thereto for the rough grinding a natural crystalline abrasive which has been crushed, sized and freed from its impurities and which is of such character that as it is crushed and broken the smaller grains or particles thereby produced are of distinct crystalline form, collecting and re-supplying to the glass such material in successively finer grades during the various stages of the rough grinding and of the smoothing operations until the surface of the glass has been ground and smoothed to a condition in which it is ready for the final polishing, substantially as described.

In testimony whereof, I have hereunto set my hand.

WILLIAM L. KANN.